United States Patent [19]
Heckhausen

[11] 3,811,347
[45] May 21, 1974

[54] DEVICE FOR STRIPPING HOSES

[75] Inventor: Hans Heckhausen, Rubensweg, Germany

[73] Assignee: Firma E. & F. Horster, Solingen, Germany

[22] Filed: Jan. 7, 1972

[21] Appl. No.: 216,051

[30] Foreign Application Priority Data
Aug. 4, 1971 Germany............................ 2138914

[52] U.S. Cl............................... 83/1, 82/4, 82/20, 83/924
[51] Int. Cl............................ B26d 3/00, B23b 3/22
[58] Field of Search......... 83/1, 924, 444, 510, 907; 81/9.51; 82/46, 20, 4

[56] References Cited
UNITED STATES PATENTS

| | | |
|---|---|---|
| 2,348,186 | 5/1944 | Bashore ............................ 82/4 R X |
| 3,354,762 | 11/1967 | Wolff .................................. 82/4 R |
| 2,641,944 | 6/1953 | Laffoon ............................ 81/9.51 R |
| 2,809,697 | 10/1957 | Menzies ................................ 82/20 |
| 356,957 | 2/1887 | Delgado ................................ 82/4 R |
| 3,577,813 | 4/1971 | Vorontsov .......................... 81/9.51 |

*Primary Examiner*—Harrison L. Hinson
*Attorney, Agent, or Firm*—Allison C. Collard

[57] ABSTRACT

A device for stripping the covering layer off hoses, particularly near the end of the hose for accommodating a union, said device using a cutting mechanism acting on the periphery of the hose and a feed mechanism for displacing the cutting mechanism with respect to the hose along a longitudinal direction, and a drive mechanism for producing rotary displacement between the cutting elements and the hose surface to be stripped.

4 Claims, 6 Drawing Figures

DEVICE FOR STRIPPING HOSES

The present invention relates to a device for peeling off the outer layer of hoses.

Hoses, particularly those incorporating steel wire fabric or steel wire spiral reinforcement, for high pressure have the outer layer of rubber on their terminal portions removed prior to receiving their end fittings. The removal of the outer top layer is referred to as "stripping" or "peeling" in the trade. This is necessary to establish a direct connection between the end fitting and the steel wire reinforcement in the hose, the latter being the actual pressure carrier. If the fitting were to only engage the outer top layer, without establishing a connection to the steel wire reinforcement, the risk would arise, at high pressures, such as at several hundred atmospheres, that the end fitting would separate from the hose even if the rubber top layer is vulcanised to the steel wire reinforcements. Rotary steel wire brushes are commonly employed in conventional devices for stripping off the top layer of the hose. To this end, the hose is turned around its axis on a mandrel and at the same time it is thrust against the rotary steel wire brush by means of an auxiliary mechanism. A considerable amount of dust and a strong unpleasant smell, are the disadvantageous results. These results are particularly bad if the tube has to be stripped and installed in inhabited areas. Attempts have been made to alleviate this by employing suction devices, which are complex and costly, depending on their job rating. Further problems arise in stripping hoses or tubes of greater diameters and lengths, particularly if these have to be turned around their own axis. In view of their high intrinsic weight and length, several people are needed to perform these tasks, resulting in high labor costs. Disregarding the high intrinsic weight and the problem posed by the need for turning the hoses around their own axis during the brushing operation, the brushing-off operation may still be performed in relatively simple manner in the case of hoses or tubes having steel wire fabric reinforcements, since the fabric continues to keep the steel wires together when the outer layer has been removed. However, hoses using steel wire coils are a different matter. The coil tends to loosen when the top layer has been removed, and stretches out so that the fitting of a union becomes difficult and very time consuming.

Upon developing a new device to strip off the top layer of hoses, the fundamental conditions to be fulfilled consist of eliminating the nuisance caused by dust and odors. Furthermore, the hose should be held stationary during the stripping operation so that the work may be performed by a single worker, even for hoses of great size. Finally, the stripping operation should be performed so that after the steel wire spirals or coils become exposed, they do not stretch out but remain in the shape prescribed.

To solve the above problems, a device has been created for stripping the top layer of hoses or tubes, using a cutting mechanism acting on the periphery of the hose. A feed mechanism is provided, for displacing the cutting mechanism and the hose to be stripped relative to each other in a longitudinal direction. A drive mechanism is provided which engenders a rotary displacement between the cutting elements of the cutting mechanism and the surface of the hose to be stripped. An advantage of this structure is that the problems of dust and odor are eliminated, since the hose or tube surface is now cut off in strip form by the cutting elements.

In a further embodiment of the invention, a mandrel is provided to receive the hose extremity. As feed linkage is coupled by means of swivel or hinge joints to the mandrel extremity protruding out of the hose. The hose is connected to the driving mechanism and the cutting mechanism comprises at least one stationary cutting element such as a stripping blade. In this device, the hose is set in rotary motion and the surface is stripped by stationary stripping blades. The mandrel is coupled to the feed linkage by means of a swivel or hinge joint, so that the hose may be moved along the stripping blades. It is possible to strip the hose surface right to its extremity or to leave a narrow rubber edging at the terminal extremity of the hose to prevent stretching of the steel wire spiral reinforcement.

In another embodiment, a stationary mandrel is arranged to receive the hose extremity so that the mandrel extremity protruding out of the hose extremity is wrought as a guiding bolt. The guiding bolt is displaceably arranged on a guiding roller which is connected to the feed linkage. The guiding roller has a groove in its external periphery engaging a guiding disc. The stripping blades are connected to the guiding disc by means of coupling rods. The stripping blades are transmissively coupled to the driving mechanism. In this device, the hose remains firmly held on the mandrel and the stripping blade or blades rotates around the periphery of the hose. In this device, it is advantageous that, apart from elimination of the production of dust and unpleasant odor, the final problem has also been resolved, namely, the hose can remain stationary instead of rotating around its own axis during the stripping operation.

It is therefore an object according to the present invention to provide an improved stripping device particularly for use on high pressure hoses to permit fittings to be joined to the ends of the hoses.

It is another object according to the present invention to provide a device for stripping the ends of hoses which is simple in design, easy to manufacture and reliable in operation.

Other objects and features of the present invention will become apparant from the following detailed description considered in connection with the accompanying drawings which disclose the embodiments of the invention. It is to be understood, however, that the drawings are designed for the purpose of illustration only and not as a definition of the limits of the invention.

In the drawings, wherein similar reference characters denote similar elements throughout the several views:

FIG. 5 shows a stripped hose wherein thin axial strips of the sheathing material have been left on.

Figure 1:
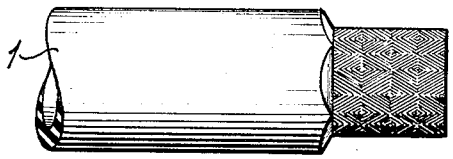
FIG. 1 shows a hose, having a steel wire fabric reinforcement.

FIG. 1 shows a hose 1 having steel wire fabric reinforcement. The steel wires retain their initial position in view of the woven arrangement, even after the removal of the covering layer. It is thus easy to install a fitting.

Figure 2:
FIG. 2 shows a hose with a steel wire coil reinforcement.

FIG. 2 shows a hose comprising steel wire spiral reinforcement. The covering layer has been removed. The spiral reinforcements still remain in their initial position. A fitting may easily be installed.

Figure 3:
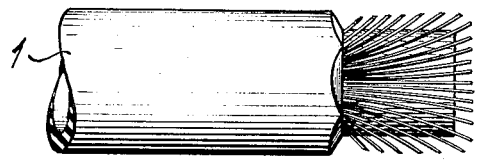
FIG. 3 shows a hose according to FIG. 2 wherein the outer layer has been brushed or "buffed" off according to conventional methods and the wire spirals have sprung apart.

FIG. 3 shows a hose comprising steel wire spiral reinforcement. The covering layer has been brushed off. The spiral reinforcements are no longer in the initial position, but have sprung apart. It is practically impossible or very difficult to install a fitting.

Figure 4:
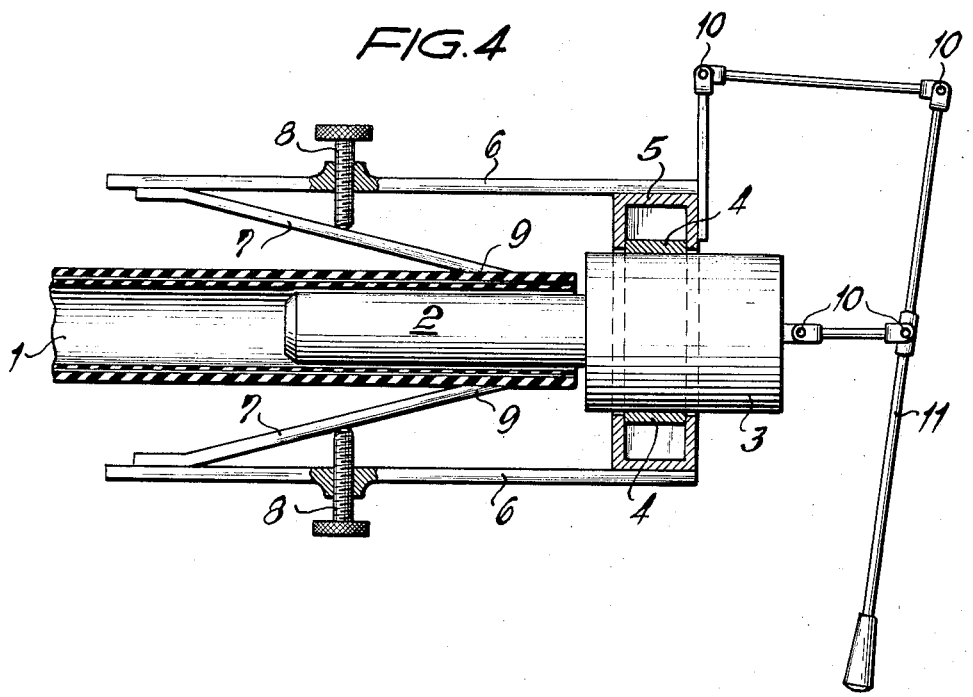
FIG. 4 shows the device of the invention using stationary stripping blades.

FIG. 4 shows a simplified plan view of a device according to the invention, designed for economic construction. Hose 1 is drawn on to a mandrel 2. The mandrel 2 is exchangeable, in accordance with the nominal bore of the hose or tube. The mandrel is mounted on a guide roller 3 which is slidably disposed in a block 5 by means of a slide bearing 4. Two guide bars 6 are fastened on block 5. Two stripping blades 7 are fastened on guide bars 6. The stripping blades are adjustable by means of adjusting screws 8. The cutting edge 9 of the stripping blades is adjusted by the set screws 8 to penetrate into the covering layer of the hose sheathing as far as the steel wire reinforcement. Guide roller 3 is coupled to feed linkage 11 by means of swivel or hinge joints 10, and a rod linkage. Forward and rearward movement of feed linkage 11 displaces guide roller 3 in an axial direction and also causes the rubber covering layer of the hose to be peeled off in strip form, in axial direction towards the extremity of the hose. Hose 1 is then (manually) rotated on its own axis and the stripping action is repeated at the new position along the periphery of hose 1, by repetition of the actuation of the feed linkage. Thus, the steps of peeling and rotating are employed until the entire hose extremity has had its covering layer removed. The device may have its block 5 mounted on a pedestal or holder, or may be clamped in a vise. During the stripping operation with the device according to the invention of FIG. 4, no unpleasant odor of any kind is caused, and manageable rubber strips are produced as scrap instead of dust. At the same time, this stripping method prevents the springing apart of the reinforcing steel wire spirals.

Figure 5:
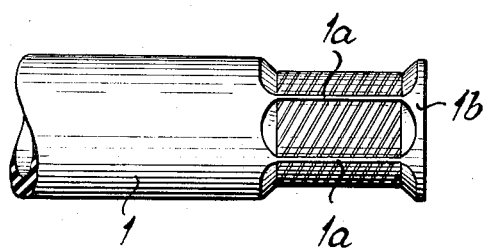

FIG. 5 shows that the rotation of the hose or tube may be performed in such manner that small thin axial strips 1a are left on the periphery of the spirals after stripping off the actual rubber covering layer vulcanised thereon. These are sufficient to hold the spirals in their initial shape. Moreover, it is also possible to adjust the stroke of the blades in such manner as to leave a narrow ring 1b behind on the hose extremity, thereby establishing a further protection for holding the wire spirals fast.

Figure 6:
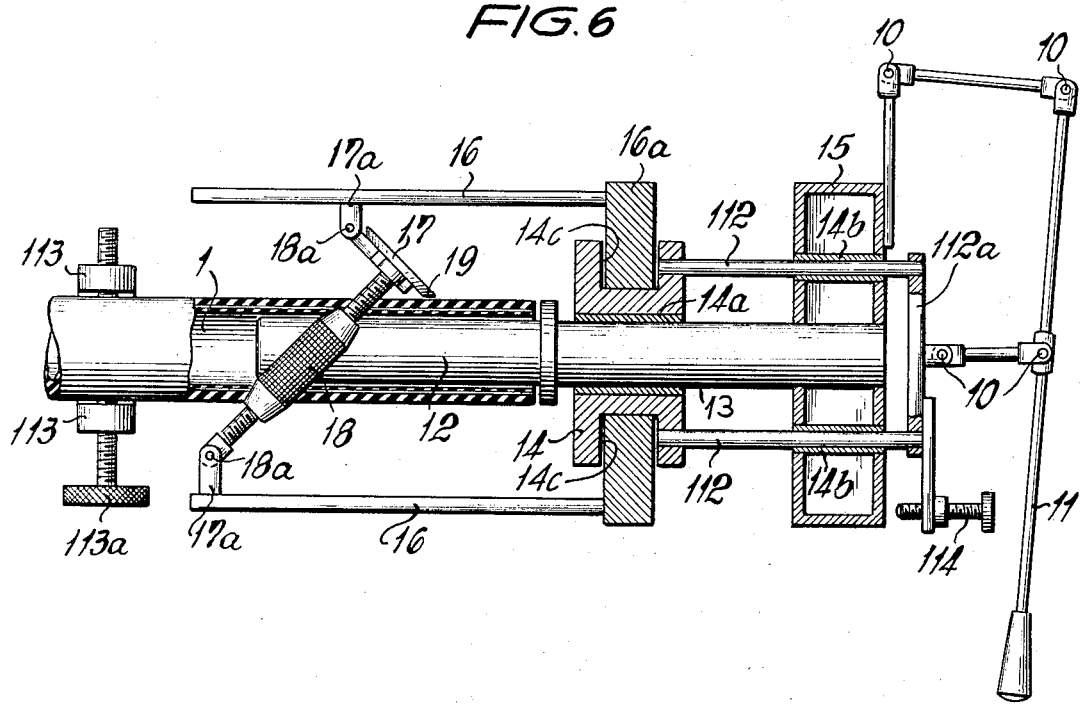
FIG. 6 shows an embodiment of the invention using revolving stripping blades.

FIG. 6 is a cross-sectional view of another embodiment of the present invention wherein hose 1 remains stationary as the cutting apparatus moves relative thereto, longitudinally along the hose periphery. Hose 1 is drawn onto a mandrel 12 that is exchangeable to accord with the nominal bore of tube or hose 1. Mandrel 12 is carried on a guide pin 13 so as to be rigidly fastened therewith, as shown. One end of guide pin 13 is secured to a block 15. Adjacent to guide pin 13 is a guide roller 14 that is slidably arranged on guide pin 13 by means of slide bearings 14a. An annular slot 14c is disposed within and about guide roller 14 for receiving a guide disc 16a. Guide disc 16a freely rotates in annular slot 14c. Guide bars 16 are rigidly attached and extend from disc 16a as shown. Guide disc 16a revolves (manually) 360° about mandrel 12.

One or more stripping blades 17 is secured to and guided by support levers 17a. Levers 17a support a threaded coupling rod or turn buckle 18 between guide bars 16 as shown. Turn buckle 18 is pivotably connected to support levers 17a by means of pivots 18a. Turn buckle 18 is fastened to blade 17 by means common in the art and therefore not shown. Stripping blade 17 will be controlled by rotating turn buckle 18 until cutting edge 19 penetrates the hose surface to the desired depth. Guide roller 14 is coupled to feed linkage 11 by means of guide rods 112, coupling plate 112a and hinge joints 10. Journal bearings 14b slidably receive guide rods 112.

Jaws 113 and locking screw 113a secure hose 1 and is fastened to block 15 by means, not shown.

The forward and rearward movement of linkage 11 moves guide roller 14 in an axial path. Since guide disc 16a is rotatably constrained by annular collar 14c of guide roller 14, displacement of roller 14 will cause a corresponding displacement in guide disc 16a and blade 17.

As blade 17 moves to the right in FIG. 6, a strip is cut from the hose covering. Disc 16a will then be indexed or positioned to another station about both mandrel 12 and hose 1. The stripping operation is repeated by rotating linkage 11 to the right when looking at FIG. 6. This sequence is repeated as often times as necessary to strip the hose. Normally, the rotations of blade 17 occur either before or after the strip is cut. It will be appreciated that hose 1 remain stationary relative to blade 17. Hose 1 is held fast by jaws 13. Guide wheel 6a carries guide bars 6, and stripping blade 7 is turned around its own axis, e.g., manually or automatically, and the stripping action is repeated by forward and rearward displacement of lever 11 until the covering layer has been stripped off the entire hose extremity. The stripping stroke is limited by means of adjusting screw 114. In this embodiment, block 15 is equipped with a holder and may thus be held fast on a block or vise. It is important that the inventive device according to FIG. 6 leaves the hose stationary during the stripping operation instead of having to rotate the hose around its own axis. This feature greatly reduces the expenditure of labor during all stripping procedures.

While only a few embodiments of the present invention have been shown and described, it will be obvious that many changes and modifications may be made thereunto without departing from the spirit and scope of the invention.

What is claimed is:

1. A device for stripping the covering layer of hoses comprising:
   a block having a plurality of apertures;
   a mandrel for receiving the hose on one end thereof;
   a guide pin having one end secured to said block and the other end concentrically fixed to the end of said mandrel;
   a guide roller having an annular groove disposed in its periphery;

a plurality of guide rods slidably disposed in the apertures of said block and coupled to said guide roller;

disc means rotatably received in said annular groove and having extending arms disposed over said mandrel;

at least one stripping blade coupled to the arms of said disc means and including a turn buckle to effect movement of said at least one stripping blade so as to control the depth of cut; and means coupled to said plurality of guide rods so as to allow axial movement of said guide roller relative to and about said guide pin for stripping a portion of hose covering, and thereafter indexing said disc means to another about the periphery of the hose, allowing repeated stripping of the hose covering.

2. The apparatus as in claim 1 further comprising means secured to said block for grasping a portion of the hose.

3. The apparatus as in claim 2 wherein said linkage means comprises a plurality of levers at least one of which is coupled to said block and another of which is coupled to at least one of said plurality of guide rods for causing axial displacement of said guide roller.

4. The apparatus as in claim 3 wherein said plurality of guide rods further include adjusting means for regulating the amount of axial displacement of said guide roller and thereby said at least one stripping blade about said mandrel carrying the hose.

* * * * *